US007538820B2

(12) United States Patent
Tomoeda et al.

(10) Patent No.: US 7,538,820 B2
(45) Date of Patent: May 26, 2009

(54) INFORMATION TERMINAL DEVICE WITH ANGLED OUTPUT UNITS

(75) Inventors: Shigeru Tomoeda, Mie (JP); Masahide Sumiyama, Mie (JP); Masanori Nakano, Mie (JP)

(73) Assignee: Panasonic Corporation, Osaka (JP)

( * ) Notice: Subject to any disclaimer, the term of this patent is extended or adjusted under 35 U.S.C. 154(b) by 672 days.

(21) Appl. No.: 10/542,108

(22) PCT Filed: Feb. 10, 2005

(86) PCT No.: PCT/JP2005/002002

§ 371 (c)(1),
(2), (4) Date: Jul. 13, 2005

(87) PCT Pub. No.: WO2005/081579

PCT Pub. Date: Sep. 1, 2005

(65) Prior Publication Data

US 2006/0052128 A1 Mar. 9, 2006

(30) Foreign Application Priority Data

Feb. 24, 2004 (JP) ............................ 2004-047271

(51) Int. Cl.
*H04M 1/03* (2006.01)
*H04N 5/64* (2006.01)

(52) U.S. Cl. ....................... 348/552; 348/838; 348/844; 455/550.1; 455/556.1; 455/569.1; 379/433.02; 381/300

(58) Field of Classification Search ................. 348/838, 348/839, 844, 836, 552; 455/556.1, 556.2, 455/550.1, 95, 575.1, 575.3, 569.1; 379/433.02, 379/428.01; 381/386, 388, 300, 306
See application file for complete search history.

(56) References Cited

U.S. PATENT DOCUMENTS

| | | | | |
|---|---|---|---|---|
| 4,998,283 | A | 3/1991 | Nishida et al. | |
| 6,040,978 | A * | 3/2000 | Spencer | 361/683 |
| 7,174,195 | B2 * | 2/2007 | Nagamine | 455/575.1 |
| 2002/0027613 | A1 * | 3/2002 | Tajima | 348/552 |
| 2004/0023697 | A1 | 2/2004 | Komura | |

FOREIGN PATENT DOCUMENTS

| | | |
|---|---|---|
| JP | 1-178952 | 7/1989 |
| JP | 2000-201396 | 7/2000 |
| JP | 2002-111817 | 4/2002 |
| JP | 2003-078601 | 3/2003 |
| KR | 20-0345703 | 3/2004 |

* cited by examiner

*Primary Examiner*—David L Ometz
*Assistant Examiner*—Jean W Désir
(74) *Attorney, Agent, or Firm*—Wenderoth, Lind & Ponack, L.L.P.

(57) ABSTRACT

An information terminal device includes a main body case, a rectangular video display unit provided on the front side of the main body case, and a plurality of audio output units disposed at a specified angle relative to the video display unit which are formed in any one of rectangular, elliptical and track shape. The plurality of audio output units are disposed symmetrically about the center line of the video display unit, and a longer side of the outer shape of each audio output unit is disposed closely to one of the mutually opposing longer sides, or one of the mutually opposing shorter sides of the video display unit.

15 Claims, 5 Drawing Sheets

FIG. 6 – PRIOR ART
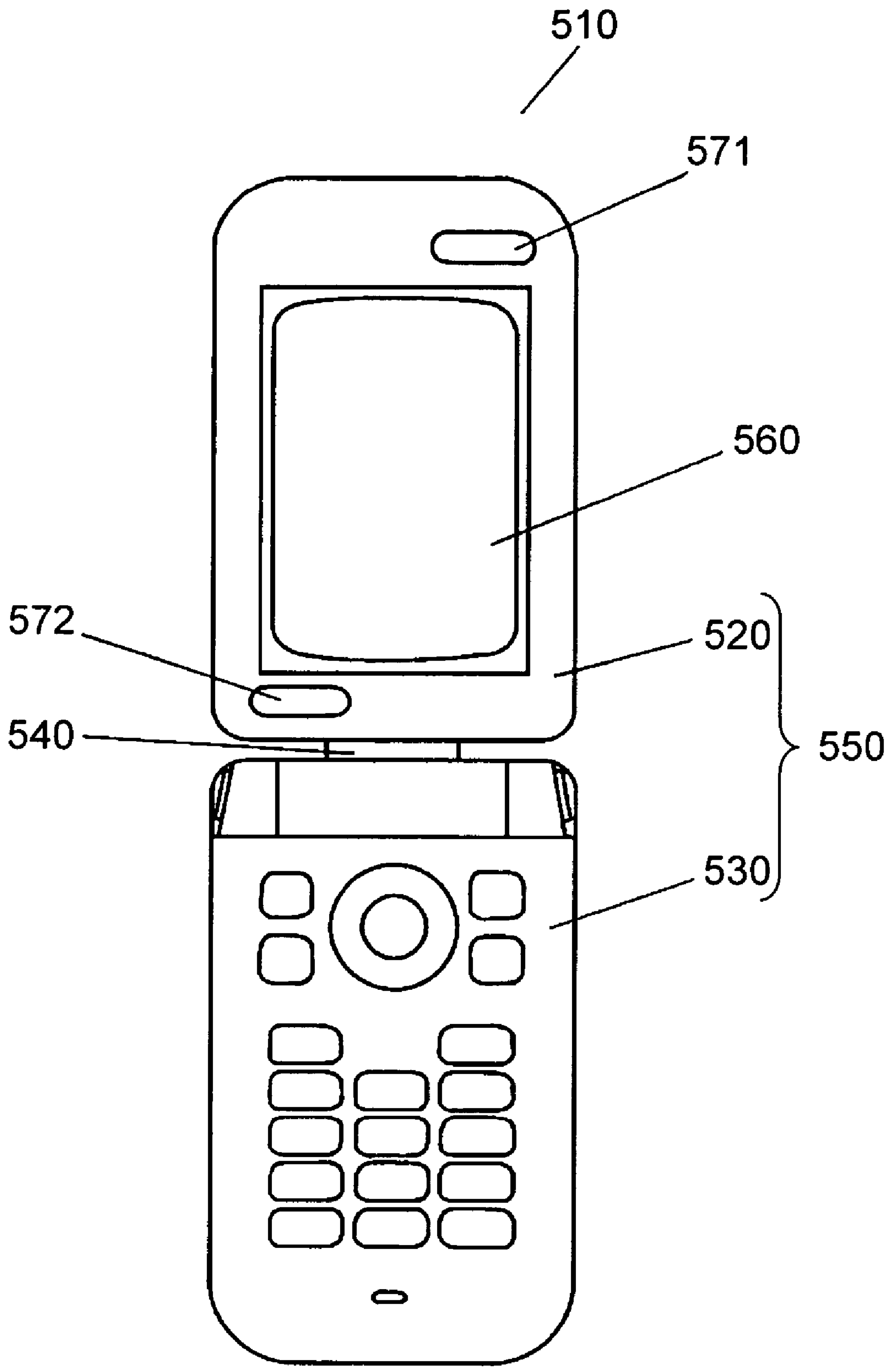

INFORMATION TERMINAL DEVICE WITH ANGLED OUTPUT UNITS

This application is a U.S. national phase application of PCT International Application PCT/JP2005/002002.

BACKGROUND OF THE INVENTION

1. Field of the Invention

The present invention relates to a mobile telephone, personal digital assistant (PDA), game machine, or other information terminal device used in various information communications.

2. Description of the Related Art

A conventional information terminal device will be explained by referring to FIG. 6. FIG. 6 is a front view of a conventional information terminal device. The information terminal device shown in FIG. 6 is a foldable mobile telephone, shown in an unfolded state.

In FIG. 6, conventional information terminal device 510 comprises upper case 520, lower case 530, and main body case 550 coupling them by means of linkage 540. Upper case 520 includes rectangular video display unit 560 provided on the front side, and audio output units 571, 572 provided on the same plane as video display unit 560. These audio output units 571, 572 are speakers disposed closely to the two corners of the upper case 520 at opposite ends of a diagonal of video display unit 560. One channel of stereophonic sound is reproduced from one speaker, and another channel of stereophonic sound is reproduced from the other one.

A conventional information terminal device similar to device 510 is disclosed, for example, in Japanese Patent Publication No. 2003-78601 (unexamined).

However, an information terminal device having such conventional configuration has difficulty reproducing reality and presence by stereophonic acoustics in stereophonic sound reproduction.

A cause of the difficulty is disagreement between video localization of video display unit 560 and audio localization in a vertical direction of audio output units 571, 572. Audio output units 571, 572 are disposed closely to the two corners at opposite ends of a diagonal of video display unit 560. That is, audio output units 571, 572 are disposed symmetrical in a diagonal form with respect to video display unit 560.

At times, the audio localization of audio output units 571, 572 is in the center of a straight line linking the two speakers. The straight line linking the audio output units 571, 572 is nearly parallel to a diagonal of upper case 520. The video localization of video display unit 560 is also in the center of the rectangular screen, and the video localization coincides with the audio localization. However, this coincidence of video localization and audio localization only occurs when the output sound pressure levels from the right and left speakers are equal to each other. In this limited condition, the sound is localized midway between the right and left speakers, and coincides with the video localization of video display unit 560. In reality, however, the speakers are very rarely operated in such condition.

When audio data is reproduced from audio output units 571, 572, the changing of audio signals at every moment always causes output sound pressure level differences between the right and left speakers. When output sound pressure level differences are caused between the right and left speakers, the sound is not localized in the center of the screen, and is deviated toward the speaker of higher sound pressure level. Due to difference in sound pressure levels of the right and left speakers, the sound comes to have a depth, and the audio localization can be moved along with the video localization.

However, when the audio localization moves on the straight line between the right and left speakers due to such change in sound pressure levels, since the straight line linking the right and left speakers is not horizontal, a problem lies in localization in the vertical direction. That is, the audio localization is also moved in the vertical direction by the portion of deviation from the center to either the upper or the lower side. This is sensed because the human audible sense works in both the lateral direction and the vertical direction.

Therefore, for the user of the information terminal device, the video localization of the video display unit and the audio localization of the audio output units do not coincide in the vertical direction. That is, the direction sense to video and the direction sense to audio do not coincide, and strangeness is felt in hearing sensation. As a result, the conventional information terminal can hardly satisfy the reality and presence by stereophonic acoustics in stereophonic reproduction.

SUMMARY OF THE INVENTION

The information terminal device of the invention comprises a main body case, a rectangular video display unit provided on the front side of the main body case, and a plurality of audio output units disposed at a specified angle to the video display unit. The audio output units are formed in any one of a rectangular, elliptical, or track shape. The plurality of audio output units are disposed symmetrically about the center line of the video display unit, and a longer side of the outer shape of each audio output unit is disposed closely to either a longer side or a shorter side of the video display unit.

In this configuration, the information terminal device of the invention reproduces a favorable reality and presence by stereophonic acoustics in stereophonic reproduction. That is, since the audio output units are disposed symmetrically about the center line of the video display unit, the audio localization in vertical direction of the audio output units coincides with the video localization in vertical direction of the video display unit. As a result, the invention satisfies the reality and presence by stereophonic acoustics in stereophonic reproduction.

BRIEF DESCRIPTION OF THE DRAWINGS

FIG. 6 is a front view of a conventional information terminal device.

REFERENCE NUMERALS IN THE DRAWINGS

Figure 1:
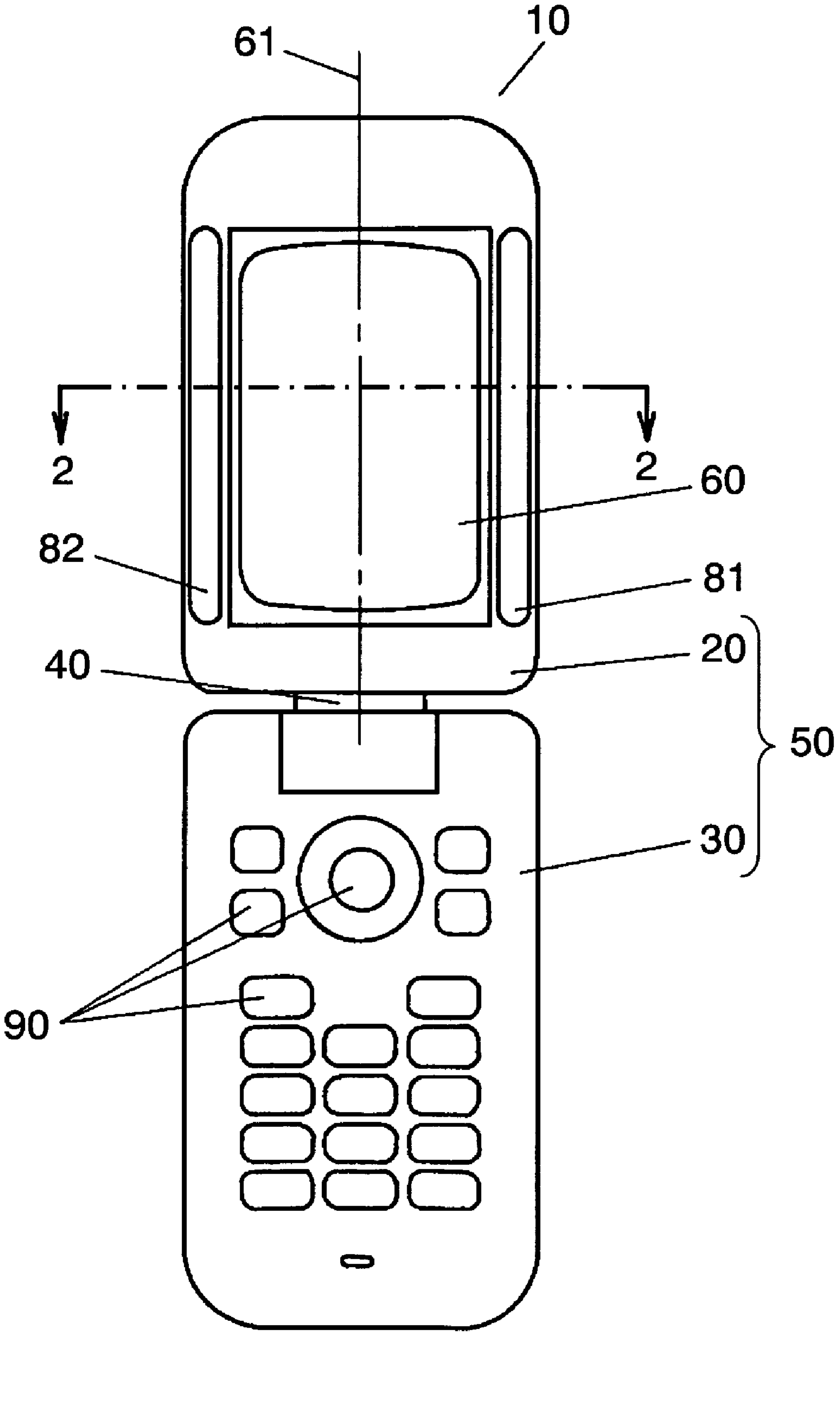
FIG. 1 is a front view of an information terminal device in accordance with a first preferred embodiment of the invention.

10 Information terminal device
20 Upper case
30 Lower case
40 Linkage
50 Main body case
60 Video display unit
61, 62 Center line
81, 82, 131, 132, 133, 134 Audio output unit
90 Operation panel
100 Electronic circuit
110 Reverse side
120 Rotation mechanism (rotary hinge)

DETAILED DESCRIPTION OF THE INVENTION

Preferred embodiments of the invention are specifically described below with reference to the drawings.

Preferred Embodiment 1

FIG. 1 is a front view of an information terminal device in accordance with a first preferred embodiment of the invention. The information terminal device is a foldable mobile telephone, and an unfolded state is shown.

Recently, in the market of small information terminal devices such as mobile telephones, which are not limited to information transmission only, higher video and audio quality have been demanded. Especially in the audio quality, as music reception and distribution are sophisticated, there is a strong desire for upgrading stereophonic reproduction for enjoying the music with an advanced reality. The information terminal device of the first preferred embodiment is devised to meet such need, and has the configuration shown in FIG. 1.

In FIG. 1, information terminal device (foldable mobile telephone) 10 comprises upper case 20, lower case 30, and main body case 50 coupling them by means of linkage 40. Upper case 20 includes rectangular video display unit 60 provided on its front side, and audio output units 81, 82 provided on the same plane as video display unit 60. Lower case 30 includes operation panel 90 composed of switches and other components.

The outer shape of audio output units 81, 82 is formed like a track. The longer side of the track shape of audio output unit 81 is disposed closely to one longer side of the rectangular shape of video display unit 60. The longer side of the track shape of audio output unit 82 is disposed closely to the other longer side of the rectangular shape of video display unit 60. The longer sides of the rectangular shape of video display unit 60 are opposite to each other. Thus, audio output unit 81 and audio output unit 82 are disposed symmetrically about center line 61 of video display unit 60. That is, audio output unit 81 and audio output unit 82 are disposed at both of the mutually opposing longer sides of video display unit 60, respectively.

Speakers used as audio output unit 81 and audio output unit 82 are not limited to a track shape, but may be freely selected from the rectangular, elliptical and track shape.

In the case of rectangular audio output units, the audio output units are disposed symmetrically with respect to center line 61 of video display unit 60, and a longer side of the outer shape of each audio output unit is disposed closely to one of the mutually opposing longer sides of video display unit 60.

In the case of elliptical audio output units, the audio output units are disposed symmetrically with respect to center line 61 of video display unit 60, and a longer side of the outer shape of each audio output unit is disposed closely to one of the mutually opposing longer sides of video display unit 60.

In the case of track shape or elliptical audio output units 81, 82, the ratio of the length of a longer side to the length of a shorter side of the outer shape is 2.5 or more, and slim speakers of large aspect ratio are used. In the case of rectangular audio output units 81, 82, the ratio of the length of a longer side to the length of a shorter side of the outer shape is 2.5 or more, and slim speakers of large aspect ratio are used.

In this configuration, by using slim speakers as audio output units 81, 82, information terminal device 10 has a wider screen, and video display unit 60 can be provided in a limited space. As a result, information terminal device 10 is reduced in size.

According to this configuration, in the information terminal device of the first preferred embodiment, sounds produced from audio output units 81, 82 in stereophonic reproduction correspond to the video image displayed from video display unit 60, and reality and presence are reproduced by stereophonic acoustics. That is, the human hearing sense, like the visual sense, works in both the lateral direction and the vertical direction. Hence, for realistic stereophonic reproduction of sound corresponding to image, it is required that the video localization of video display unit 60 and the audio localization of audio output units 81, 82 coincide for the user of information terminal device 10.

In the information terminal device of the first preferred embodiment, audio output units 81, 82 are disposed symmetrically about center line 61 in the longitudinal direction of video display unit 60. Accordingly, the straight line linking audio output unit 81 and audio output unit 82 is horizontal. Therefore, the audio localization of audio output units 81, 82 is in the center of the straight line linking these two speakers when the output sound pressure levels from the two speakers are equal to each other. The video localization of video display unit 60 is also in the center of the rectangular screen. As a result, the video localization and the audio localization coincide with each other.

Thus, by coincidence between the video localization and the audio localization of information terminal device 10, for example, when the image reproduced by video display unit 60 is a moving picture, a difference is caused in the output sound pressure levels from the right and left speakers depending on the lateral motion of the moving picture, so that the sound emitted by audio output units 81, 82 can be moved in the lateral direction. As a result, a stereophonic sound field can be reproduced without any sense of strangeness.

As mentioned above, in the information terminal device of the first preferred embodiment, at the time of stereophonic reproduction, the audio localization delivered from audio output units 81, 82 corresponds to the video localization displayed by video display unit 60, so that reality and presence by stereophonic acoustics can be reproduced.

Figure 2:
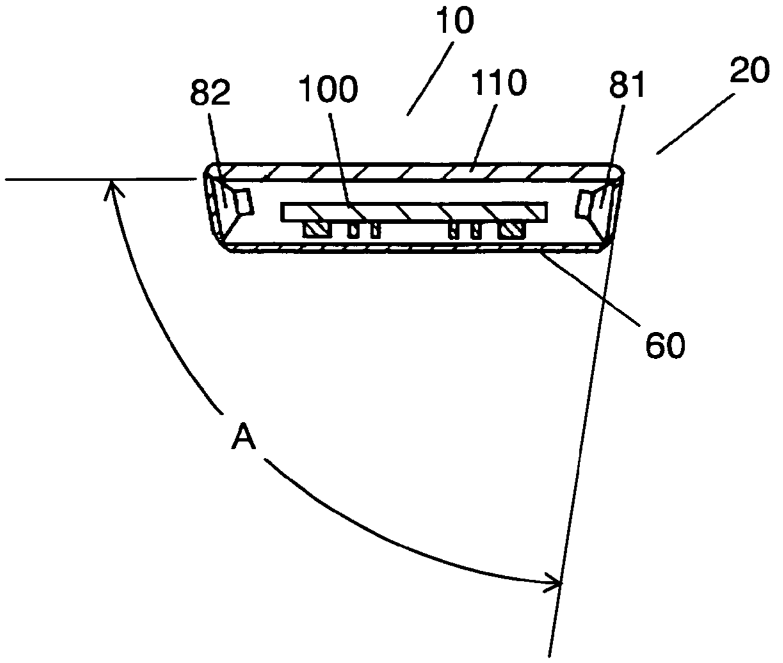
FIG. 2 is a sectional view of the information terminal device in accordance with the first preferred embodiment of the invention.

Referring next to FIG. 2, the layout angle of the audio output units corresponding to the video display unit in the information terminal device of the first preferred embodiment is explained. FIG. 2 shows essential parts of the information terminal device sin sectional view, taken along line 2-2 of FIG. 1.

In FIG. 2, information terminal device 10 has video display unit 60 at the front side (lower side in FIG. 2) of upper case 20. Inside of upper case 20, electronic circuit 100 is provided for controlling video display unit 60. Speakers are disposed at both sides of video display unit 60 as audio output units 81, 82.

The layout angle of audio output units 81, 82 corresponding to video display unit 60 is such that the angle A formed between the front side (sound emitting surface) of audio output units 81, 82 and reverse side 110 of video display unit 60 is in a range of 0 degree to 90 degrees, the angle A being 0 degree when the front side (image display surface) of video display unit 60 and the front side (sound emitting surface) of audio output units 81, 82 are disposed on the same plane, and the angle A being 90 degrees when the front side of video display unit 60 and the front side of audio output units 81, 82 are perpendicular. As a result, audio output units 81, 82 are directed outside of upper case 20.

In this configuration, at the time of stereophonic reproduction, sounds produced from audio output units 81, 82 correspond to video images from video display unit 60, and reality and presence by stereophonic acoustics can be enhanced. That is, if the sound is reproduced from information terminal device 10 reduced in size, the sound diffuses as stereophonic sound, and a sound field having a wide service area can be formed, and the sense of presence can be enhanced.

Moreover, by disposing the speakers serving as audio output units 81, 82 at a specified angle, video display unit 60 of maximum size can be disposed in the limited space of upper case 20.

Thus, according to the invention, in spite of the small size, an information terminal device sufficiently satisfying the requirements of reality and presence by stereophonic acoustics at the time of stereophonic reproduction can be presented.

Figure 3:
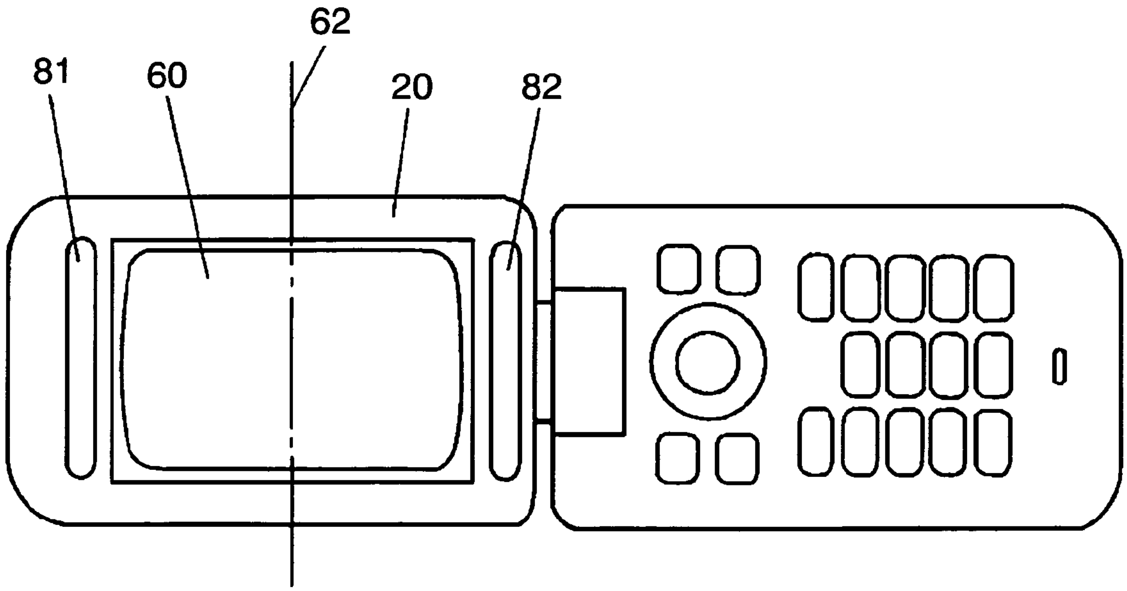
FIG. 3 is a front view of a variant of the first preferred embodiment of the invention.

FIG. 3 is a front view of a variant of the first preferred embodiment of the invention. In the information terminal device shown in FIG. 3, a longer side of the outer shape of each of the audio output units is disposed closely to a corresponding shorter side of the video display unit.

In FIG. 3, upper case 20 of the information terminal device includes rectangular video display unit 60 provided on its front side, and audio output units 81, 82 provided on the same plane as this video display unit 60.

The outer shape of audio output units 81, 82 is a track shape. The longer side of the track shape of audio output unit 81 is disposed closely to one shorter side of the rectangular shape of video display unit 60. The longer side of the track shape of audio output unit 82 is disposed closely to the other shorter side of the rectangular shape of video display unit 60. The shorter sides of the rectangular shape of video display unit 60 are opposite to each other. Thus, audio output unit 81 and audio output unit 82 are disposed symmetrically about the center line 62 of video display unit 60. That is, audio output unit 81 and audio output unit 82 are disposed at both of the mutually opposing shorter sides of video display unit 60, respectively.

Speakers used as audio output units 81, 82 are not limited to a track shape, but may be freely selected from the rectangular, elliptical and track shape.

In the case of rectangular audio output units, the audio output units are disposed symmetrically with respect to center line 62 of video display unit 60, and a longer side of the outer shape of each audio output unit is disposed closely to one of the mutually opposing shorter sides of video display unit 60.

In the case of elliptical audio output units, the audio output units are disposed symmetrically with respect to center line 62 of video display unit 60, and a longer side of the outer shape of each audio output unit is disposed closely to one of the mutually opposing shorter sides of video display unit 60.

As shown in FIG. 3, when the information terminal device is used in a wide direction, video display unit 60 provided in the upper case 20 becomes a wide rectangular shape. In this case, as video display unit 60, a liquid crystal panel with an aspect ratio of 3:4 to 9:16 may be used. In this case, although the information terminal device is a mobile telephone, a liquid crystal panel having an aspect ratio equivalent to that of a liquid crystal panel of a television receiver or the like is realized. As a result, together with stereophonic sound, an information terminal device with excellent reality and presence not experienced before can be presented.

In the first preferred embodiment, the information terminal device is a mobile telephone. But, the features of the first preferred embodiment are not limited to this, and may be further widely applied and extended into a personal digital assistant (PDA), small game machine, car navigation system, portable television, video camera monitor, and other devices.

Preferred Embodiment 2

Figure 4B:
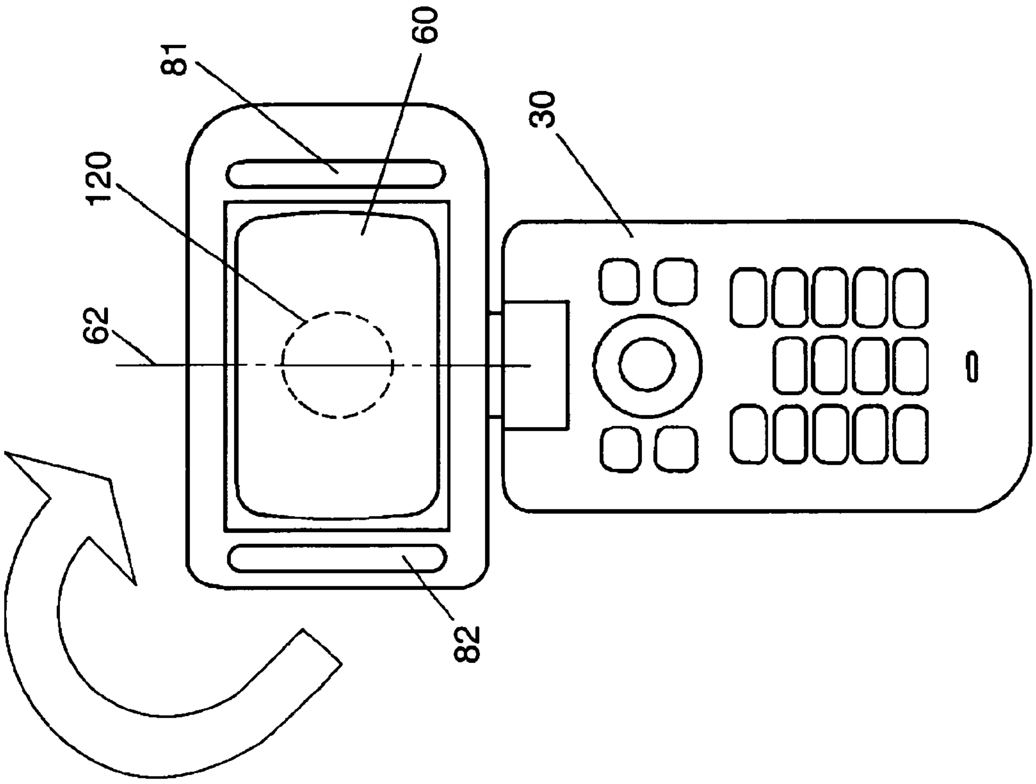
FIG. 4B is a front view of an upper case of the information terminal device shown in FIG. 4A, in a rotated position.
Figure 4A:
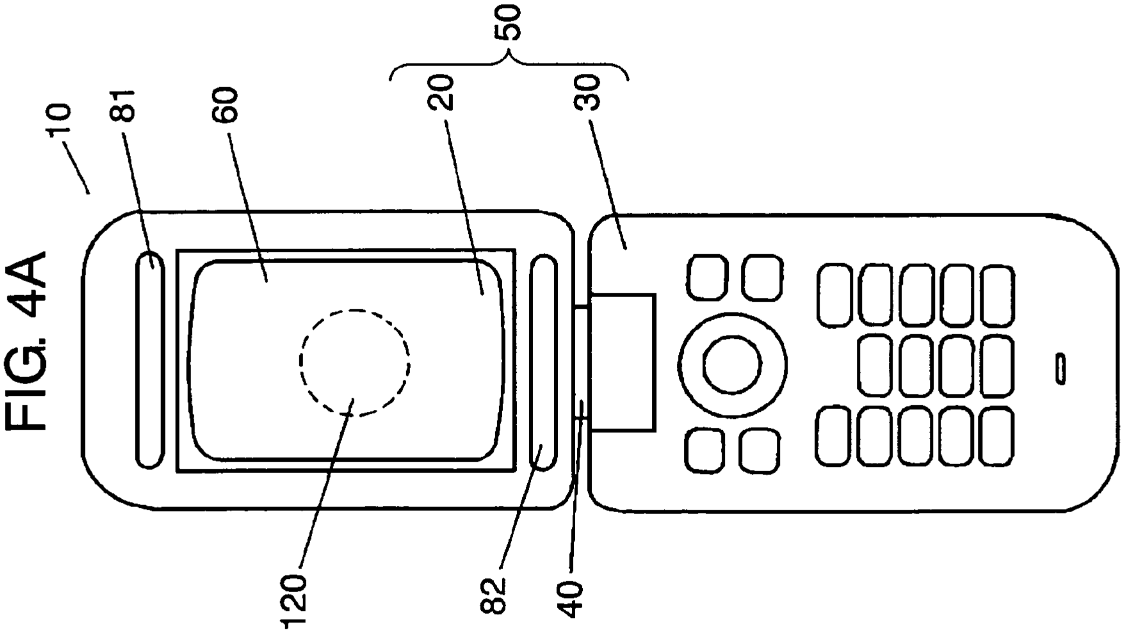
FIG. 4A is a front view of an information terminal device in accordance with a second preferred embodiment of the invention.

FIG. 4A is a front view of an information terminal device in accordance with a second preferred embodiment of the invention. FIG. 4B is a front view of an upper case of the information terminal device shown in FIG. 4A, in a rotated state.

In FIG. 4A, information terminal device (foldable mobile telephone) 10 comprises upper case 20, lower case 30, and main body case 50 coupling them by means of linkage 40. Upper case 20 includes rectangular video display unit 60 provided on its front side, and audio output units 81, 82 provided on the same plane as video display unit 60. Lower case 30 includes an operation panel composed of switches and other components. Upper case 20 can be folded on lower case 30 by means of linkage 40.

The outer shape of audio output units 81, 82 is formed like a track. The longer side of the track shape of audio output unit 81 is disposed close to one shorter side of the rectangular shape of video display unit 60. The longer side of the track shape of audio output unit 82 is disposed closely to the other shorter side of the rectangular shape of video display unit 60. The shorter sides of the rectangular shape of video display unit 60 are opposite to each other.

Thus, audio output unit 81 and audio output unit 82 are disposed symmetrically about center line 62 of video display unit 60. That is, audio output unit 81 and audio output unit 82 are disposed at the two mutually opposing shorter sides of video display unit 60, respectively.

The second preferred embodiment differs from the first preferred embodiment in that rotation mechanism 120 is provided to rotate upper case 20 with respect to lower case 30, so that video display unit 60 may be used either in a wide profile or in a long profile. In information terminal device 10 of the second preferred embodiment, a rotary hinge is used as rotation mechanism 120.

Audio output units 81 and 82 are of track shape, but a rectangular or an elliptical shape may be also used.

As shown in FIG. 4A, in the information terminal device of the second preferred embodiment, audio output unit 81 is disposed in the upper part of video display unit 60, and audio output unit 82 is disposed in the lower part of video display unit 60. A longer side of the outer shape of each of audio output units 81, 82 is disposed closely to one of the mutually opposing shorter sides of video display unit 60, and audio output units 81, 82 are disposed symmetrically about center line 62 of video display unit 60 shown in FIG. 4B.

In such configuration, the profile of information terminal device 10 can be changed. That is, when carrying information terminal device 10, it is folded as shown in FIG. 4A. By contrast, when video display unit 60 of information terminal device 10 is used, that is, when viewing the visual telephone or moving image, upper case 20 is rotated 90 degrees by rotary hinge 120, and video display unit 60 can be shifted from a long profile, as shown in FIG. 4A, to a wide profile, as shown in FIG. 4B.

In this configuration, when information terminal device 10 of the second preferred embodiment reproduces stereophonic sound, sounds produced from audio output units 81, 82 correspond to the video image displayed on video display unit 60, and reality and presence by stereophonic acoustics can be realized. That is, upper case 20 is rotated 90 degrees by rotary hinge 120, and video display unit 60 is shifted from a long profile to a wide profile, so that video display unit 60 has a large aspect ratio is obtained while in use.

Since audio output units 81, 82 are disposed symmetrically about center line 62 in the longitudinal direction of video display unit 60 after rotation, the video image of video display unit 60 of large aspect ratio and the sounds produced from audio output units 81, 82 coincide with each other. As a result, in the invention, at the time of stereophonic reproduction, the sounds produced from audio output units 81, 82 correspond to the video image of large aspect ratio displayed on video display unit 60, so that reality and presence by stereophonic acoustics can be realized.

In the second preferred embodiment, the information terminal device is a mobile telephone. But, the features of the second preferred embodiment are not limited to this, and may be further widely applied and extended into a personal digital assistant (PDA), small game machine, car navigation system, portable television, video camera monitor, and other devices.

Preferred Embodiment 3

Figure 5:
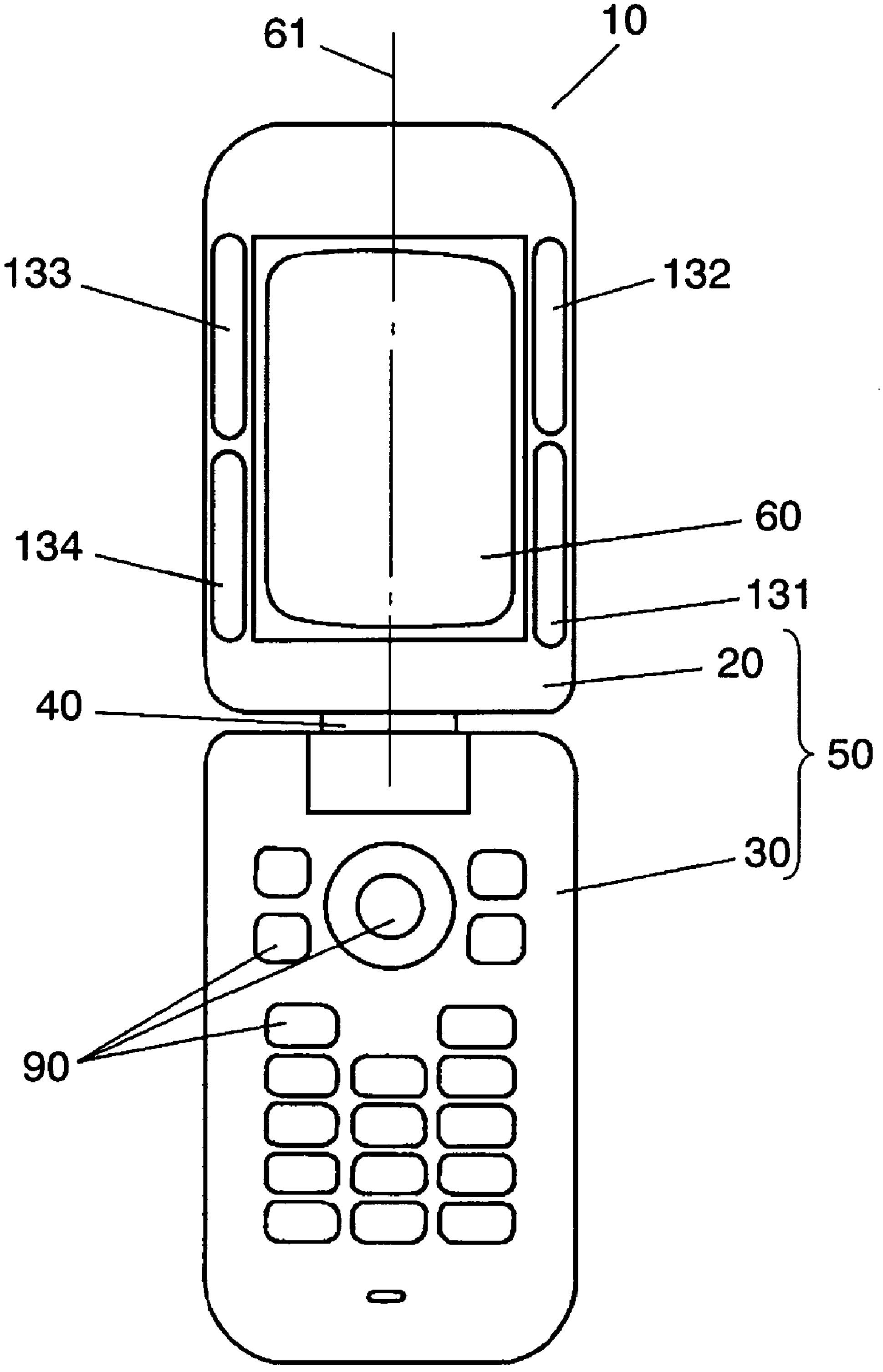
FIG. 5 is a front view of an information terminal device in accordance with a third preferred embodiment of the invention.

FIG. 5 is a front view of an information terminal device in accordance with a third preferred embodiment of the invention. In FIG. 5, information terminal device 10 comprises upper case 20, lower case 30, and main body case 50 coupling them by means of linkage 40. Upper case 20 includes rectangular video display unit 60 provided on its front side, and audio output units 131, 132, 133, 134 provided on the same plane as video display unit 60. Lower case 30 includes operation panel 90 composed of switches and other components.

The outer shape of audio output units 131, 132, 133, 134 is formed like a track. A longer side of the track shape of each of the audio output units 131, 132 is disposed closely to one longer side of the rectangular shape of video display unit 60. A longer side of the track shape of each of the audio output units 133, 134 is disposed closely to the other longer side of the rectangular shape of video display unit 60. The longer sides of the rectangular shape of video display unit 60 are opposite to each other. Audio output units 131, 132 and audio output units 133, 134 are disposed symmetrically about center line 61 of video display unit 60. That is, audio output units 131, 132 and audio output units 133, 134 are disposed at both sides of the mutually opposite longer sides of video display unit 60, respectively.

Speakers used as audio output units 131, 132, 133, 134 are not limited to a track shape, but may be freely selected from the rectangular, elliptical and track shape.

In the third preferred embodiment shown in FIG. 5, what differs from the first preferred embodiment is that audio output units 131, 132, 133, 134 are provided in upper case 20. A longer side of the outer shape of each of the audio output units 131, 132 is disposed closely to one of the mutually opposing longer sides of video display unit 60, and a longer side of each of the audio output units 133, 134 is disposed closely to the opposite longer side of video display unit 60. That is, as audio output units, a total of four speakers are provided, two at both sides of video display unit 60, at both sides of center line 61 of upper case 20.

In this configuration, sounds produced from audio output units 131, 132, 133, 134 at the time of stereophonic reproduction correspond to the video image displayed on video display unit 60, and reality and presence by stereophonic acoustics can be realized. That is, if small and slim speakers are used as audio output units, the video localization of video display unit 60 and the audio localization of audio output units 131, 132, 133, 134 coincide with each other.

Therefore, in the information terminal device of the third preferred embodiment, coincidence of video and audio localization can be achieved without using the slim speakers in the shape of the audio output units in the first preferred embodiment shown in FIG. 1, that is, slim speakers having longer sides with a length nearly equal to the length of the longer sides of the video display unit. Therefore, coincidence of video localization and audio localization can be achieved by using much smaller speakers.

Thus, by achieving coincidence of video localization and audio localization, for example, when the video reproduced by the video display unit is a moving picture, sounds produced by the audio output units can be moved in vertical and lateral directions corresponding to the vertical and lateral motions of the moving picture, so that a satisfactory stereophonic sound field can be reproduced without any sense of strangeness.

The number of speakers used as audio output units is not limited to four, but a plurality of speakers may be disposed symmetrically on both sides of the center line of the upper case.

In FIG. 5, a longer side of the outer shape of each of the audio output units 131, 132 is disposed closely to one of the mutually opposing longer sides of video display unit 60, and a longer side of the outer shape of each of the audio output units 133, 134 is disposed closely to the opposite longer side of video display unit 60; but, the information terminal device of the third preferred embodiment is not limited to this configuration.

That is, although not shown in the drawings, the longer sides of the outer shape of audio output units 131, 132, 133, 134 may also be disposed closely to each one of the mutually opposite shorter sides of video display unit 60. As a result, when information terminal device 10 is used in the wide profile, video display unit 60 has a wide longitudinal shape as shown in FIG. 3, and if small slim speakers are used, video localization and audio localization of information terminal device 10 can be matched correctly.

In this case, video display unit 60 is a liquid crystal panel of the aspect ratio of 3:4 to 9:16, and although the information terminal device is a mobile telephone, a video display unit having an aspect ratio equivalent to that of the video display unit of a television receiver or the like is realized. As a result, together with stereophonic sound, an information terminal device with excellent reality and presence not experienced before can be presented.

Besides, in order for video display unit 60 to be shifted from the long profile to the wide profile, a rotation mechanism (hinge or the like) is provided so as to rotate upper case 20 on lower case 30. In this case, a longer side of the outer shape of each of the audio output units 131, 132, 133, 134 is disposed closely to one of the mutually opposite shorter sides of video display unit 60.

As a result, if small slim speakers are used, information terminal device 10 can be used and carried in different positions. That is, when carrying information terminal device 10, it can be folded. When using video display unit 60 of information terminal device 10, that is, when viewing the visual telephone or moving picture, upper case 20 is rotated by 90 degrees by rotary hinge 120, and video display unit 60 can be changed from the long profile to the wide profile.

Therefore, the invention has the effect of reproducing reality and presence by stereophonic acoustics, at the time of stereophonic reproduction, by correspondence between the sounds from the audio output units and the video image from the video display unit, and the features thereof can be further widely applied and extended into a mobile telephone, personal digital assistant (PDA), small game machine, car navigation system, portable television, video camera monitor, and other information terminal devices.

The invention claimed is:

1. A mobile telephone comprising:

a main body case having a front side;

a rectangular video display unit on said front side of said main body case, said rectangular video display unit having an image display surface, a pair of mutually opposing short sides, and a pair of mutually opposing longer sides; and a plurality of audio output units on said front side of said main body case, said audio output units having a sound emitting surface, a pair of mutually opposing short sides, and a pair of mutually opposing longer sides, wherein said audio output units are arranged symmetrically about a center line of said video display unit such that one of said longer sides of each audio output unit is adjacent to said video display unit, and each of said audio output units is oriented such that said sound emitting surface forms an angle with said image display surface of said video display unit that is greater than 0 degrees, and not more than 90 degrees.

2. The mobile telephone of claim 1, wherein each of said audio output units is oriented such that said sound emitting surface forms an angle with said image display surface of said video display unit that is not less than 45 degrees.

3. The mobile telephone of claim 1, wherein one of said longer sides of each of said audio output units is adjacent to one of said longer sides of said video display unit.

4. The mobile telephone of claim 1, wherein one of said longer sides of each of said audio output units is adjacent to one of said short sides of said video display unit.

5. The mobile telephone of claim 1, wherein, in each of said audio output units, a ratio of a length of one of said longer sides to a length of one of said short sides is 2.5 or more.

6. The mobile telephone of claim 1, wherein said audio output units are capable of reproducing stereophonic sound.

7. The mobile telephone of claim 5, wherein said audio output units are capable of reproducing stereophonic sound.

8. The mobile telephone of claim 1, wherein:

said main body case comprises an upper portion, and a lower portion which is foldably coupled to said upper portion by a linkage;

said video display unit and said audio output units are arranged in said upper portion of said main body case;

a rotation mechanism is coupled to said upper portion of said main body case for allowing said upper portion to rotate relative to said lower portion so as to allow said video display unit to be rotated between a long profile position and a wide profile position;

one of said longer sides of a first one of said audio output units is adjacent to one of said short sides of said video display unit; and one of said longer sides of a second one of said audio output units is adjacent to a second one of said short sides of said video display unit.

9. The information terminal device of claim 8, wherein, in each of said audio output units, a ratio of a length of one of said longer sides to a length of one of said short sides is 2.5 or more.

10. The mobile telephone of claim 8, wherein said audio output units are capable of reproducing stereophonic sound.

11. The mobile telephone of claim 9, wherein said audio output units are capable of reproducing stereophonic sound.

12. The mobile telephone of claim 1, wherein a plurality of said audio output units are adjacent to each of said short sides of said video display unit.

13. The mobile telephone of claim 1, wherein a plurality of said audio output units are adjacent to each of said longer sides of said video display unit.

14. The mobile telephone of claim 8, wherein a plurality of said audio output units are adjacent to each of said short sides of said video display unit.

15. The mobile telephone of claim 8, wherein a plurality of said audio output units are adjacent to each of said longer sides of said video display unit.

* * * * *